3,113,856
APPARATUS FOR CHARGING SHAFT
FURNACES AND THE LIKE
Emile Plumat, Gilly, Pierre Eloy, Lodelinsart, and Marcel Gantois, Jumet, Belgium, assignors to Union des Verreries Mecaniques Belges, Societe Anonyme, Charleroi, Belgium, a company of Belgium
Filed Sept. 12, 1958, Ser. No. 760,809
Claims priority, application Belgium Sept. 21, 1957
4 Claims. (Cl. 65—335)

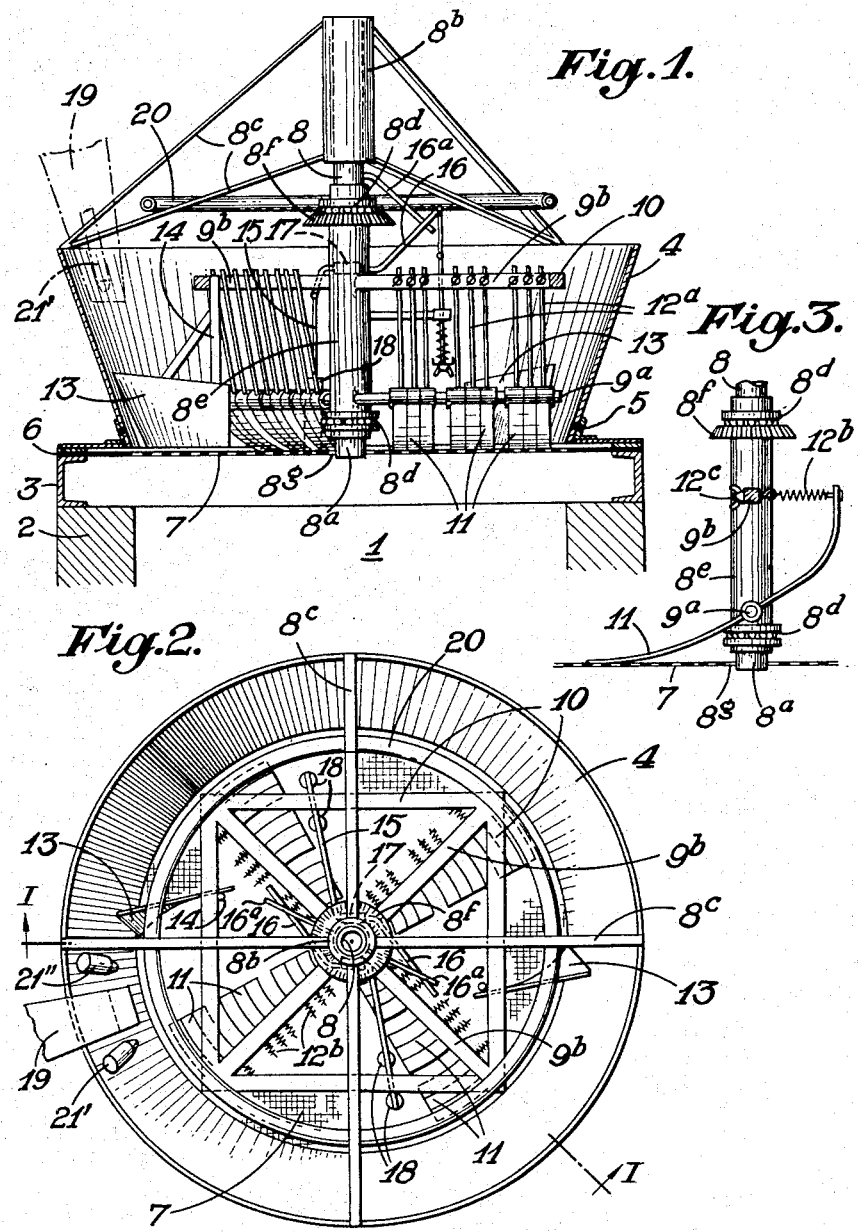

The present invention relates to a process and an apparatus for charging shaft furnaces and the like with starting materials and especially for introducing glass batches into furnaces according to U.S. Patents Nos 2,634,555 and 2,718,096.

These patents disclose a process for melting glass, in which the starting materials are supplied to the upper part of a vertical tubular furnace, at the base of which the molten glass collects. The flames are injected from the base through the molten glass. The fumes, after having given up the sensible heat to the molten glass, rise to the top of the apparatus and give up their residual heat to the starting materials descending in countercurrent thereto. Before being introduced into the top of the furnace, the starting materials are intimately mixed to form what is called the batch in order to facilitate their melting and to promote the homogenisation of the glass.

The inventors have observed that it is desirable to introduce the batch in the form of agglomerated granules, of like chemical composition, rather than to introduce it in the pulverized form which it possesses on leaving the mixer.

It has been observed that in this latter form the various constituent elements, falling freely in the rising current of fumes, preserve their individuality during the fall, which impedes the reactions until the instant when they reach the base of the furnace.

It has also been observed that the free fall to some extent promotes the segregation of the materials, so that:

On the one hand, the homogeneity of the mixture is partially destroyed when the products reach the molten bath, and On the other hand, the finer grains are fairly easily carried along by the fumes, whereby the chemical composition of the molten product is modified and a loss of material and some pollution of the atmosphere are caused.

The introduction of the charge into the furnace in the form of agglomerated granules permits of obviating the aforesaid disadvantages and in addition has the advantage of very considerably reducing the corrosion of the refractories of the furnace by substantially eliminating all formation of batch dust.

Finally, the inventors have observed that the conversion of the batch into granules by agglomeration as proposed by the invention results in a more rapid melting of the starting materials, owing to the more rapid heating which results from the increase in the surface presented by the granules to the action of the flames. This rapid melting is further promoted by the fact that each element of material in each grain is already associated with the other materials necessary for the composition of the glass.

Processes for the granulation of glass batch are known, in which use is made of an additive product as a binder for agglomerating the various materials together, the operation being carried out under relatively high compression which gives highly compacted grains. In addition, these processes are generally very costly.

On the other hand, the present invention relates to the granulation of the batch without the use of an additive and by relatively simple and inexpensive means which permit of obtaining grains of relatively low compactness, which absorb the heat of the fumes well without crumbling under the effect of the shock which they undergo during the free fall.

According to the invention, the mixture of starting materials constituting the batch or the charge is subjected during its introduction into the furnace to a conversion into granules by an agglomeration in two consecutive stages, the first of which consists in converting the said mixture, previously moistened, into granules by a mechanical agglomeration, while the second consists in subjecting the said mechanically agglomerated granules to a thermal agglomeration under the effect of the heat of the medium through which the introduced granules are obliged to pass when entering the furnace before reaching the melting bath.

An advantageous procedure consists in pouring on to a screen a regular supply of batch which is regularly and continuously distributed over the screen and subjected to a continuous pressure to cause it to pass through the latter. Certain precautions which will hereinafter be described are taken in order to impart a certain compactness to the mixture and there are obtained at the bottom of the screen small cylinders of batch, the cross-section of which is a function of that of the meshes of the screen.

The said cylinders have, after the mechanical agglomeration, a certain consistency, but their structure is rather "dry," that is to say, they are by no means viscous and do not flow appreciably. The structure is thus rather frangible, so that the cylinders of material are fragmented as they leave the apertures of the screen to form granules whose length is approximately equal to the thickness or to the diameter of the cylinders. In the preparation of the batch for plate glass (soda-lime glass) the grains are generally given dimensions of the order of from 2 to 4 mm., but these dimensions may be substantially exceeded under some conditions.

The said mechanical granulation is automatically improved by the fact that, as a result of their subsequent heating—both under the effect of the radiation of the molten glass bath and of the walls of the furnace, and under the effect of the heat exchange between the grains falling in the rising fumes and the latter—the granules undergo a rapid sintering which substantially increases their cohesion.

It is to be noted that this phenomenon occurs as soon as the granules have formed and begin to fall. At this instant, the radiation exerted is already intense, whereby moisture is extracted, which increases the consistency of the grains, which consistency is further increased by the crystallisation of the alkaline elements of the batch. In this way, the cohesion of the granules may be relatively weak at the instant when they leave the apertures of the screen, since the heat will harden them immediately and then imparts thereto the desired resistance to enable them to reach the molten glass bath without becoming substantially disintegrated. The latter is all the more true as the sintering of the granules continues, owing to their progressive heating by the fumes, during the period of their fall.

It is known that glass batch in the perfectly dry state is a product having no consistency, but that in fact the sand, in particular, always contains some water, the quantity of which varies in accordance with the atmospheric conditions. It is generally desirable to determine the water content of the starting materials in order to verify their proportionality in the preparation of the batch. It is also useful to maintain this water content at a constant value in order to ensure regularity of operation.

It is therefore desirable to add to the composition a quantity of water which permits of regularly obtaining a constant water content.

In the invention, this operation is utilised to moisten the composition in such manner as to obtain a water content between 5% and 8% and to facilitate the agglomeration during the granulation.

The invention also concerns an apparatus for carrying out the process hereinbefore described, the said apparatus being characterised, in general, in that it comprises at least one granulating device so arranged as to effect, on the one hand, the conversion of the batch into granules during its introduction into the furnace, and on the other hand the admission of the granulated batch into a chamber of a furnace in which the granules undergo a sintering before reaching the melting bath.

An example of the performance of the process and of the charging apparatus of the invention is hereinafter described with referenct to the accompanying drawings, in which:

FIGURE 1 is a diagrammatic sectional elevation of the charging apparatus;

FIGURE 2 is a plan view according to FIGURE 1 and FIGURE 3 is a side view of a detail of the apparatus.

Disposed at the top of a shaft furnace 1 which may be for example, of the type described in the aforementioned patent specification and of which only the upper parts of the walls 2 are shown, is a bed 3 on which is mounted a charging apparatus.

The latter consists mainly of a frustoconical tank 4 attached to the bed 3 by any appropriate securing means, such for example as rivets or welded joints 5 and 6, or an assembly system comprising nuts and bolts, which are removable.

The base of the tank 4 consists of a screen 7 either of the mesh type or of the perforated-plate type, through which the batch is passed so as to convert it into granules as hereinafter explained. For this purpose the intimately mixed and moistened batch is introduced into the tank 4, in which it is subjected to the action of members hereinafter described.

Mounted above the screen 7 along the axis of the furnace is a tubular column 8, the said screen having at its centre an aperture 8g into which the column 8 is fitted at its lower end 8a so as to be readily detachable. A reinforced upper part 8b of the column 8 is fixed on the tank 4 by tie rods 8c. After removal of the tank 4 with the system 8, 8a, 8b, 8c and all the members which it supports, as hereinafter described, the said assembly permits of readily replacing the screen 7.

The tubular column 8 constitutes an inspection hole for observing the working process taking place in the furnace. The said column is also used to support, for example, between ball bearings 8d, a rotary sleeve 8e which in turn supports four radial pins 9a (see also FIGURE 3) situated at intervals of 90° around the rotary sleeve, and four radial arms 9b disposed above the four pins 9a and connected together by a frame 10. There is so mounted on each of the four radial pins 9a as to be angularly displaceable about the respective pins a series of scraper pressers 11 bearing on the screen 7 and each provided with an upwardly bent arm 12a, the upper end of which is connected by a spring 12b to the corresponding radial arm 9b through an adjustable tensioning device 12c by means of which the pressure of the respective scrapers 11 on the screen 7 can be adjusted.

The rotation of the system 8e, 9 to 12 about the column 8 is effected by any appropriate means, not shown, driving a bevel wheel 8f fast with the sleeve 8e. Thus, the latter drives in its rotational movement all the scrapers 11, which rub on the screen 7 and force the intimately mixed and moistened batch admitted to the screen 7 through a chute 19 to penetrate through the meshes in the screen.

The chute 19 is advantageously so inclined that the batch can descend therein simply by gravity from a storage hopper (not shown). The moistening of the batch can be effected at the instant when the latter leaves the chute 19, for example by means of sprayers 21', 21", which may be disposed on either side of the jet of batch leaving the chute 19, so as to ensure uniform and complete moistening of the batch.

The mixed and moistened batch which the scrapers thus constrain to pass through the meshes in the screen 7 forms small cylinders, the cross-section of which is determined by that of the meshes. The said cylinders are fairly compact by reason of the compression to which they are subjected. It has been observed that if the moisture of the batch is appropriately adjusted, it is possible to impart thereto a consistency such that the cylinders formed are divided into relatively short lengths (that is to say, of an order equal to their thickness) or diameter. Of the moisture is not well adjusted, the materials do not become sufficiently agglomerated and in this case they pass through the screen without becoming granulated, or again they have excessive plasticity and do not separate sufficiently as a consequence of which they form more or less elongated fragments, of which the ratio of surface to volume is too small, whereby the melting yield is reduced.

It is in fact sufficient to maintain the moisture of the batch, at the time when it is introduced into the furnace, approximately between 5% and 8%, for example with the aid of a fixed or movable bank of sprinklers 20.

In this way, the cylinders forced by pressure through the meshes in the screens 7 acquire sufficient cohesion to pass through the thickness of the screens without becoming disintegrated.

As they leave the meshes of the screen, the cylinders of material are reduced to granules, which are immediately subjected to the effect of the radiation from the glass and from the walls of the furnace and to the effect of the hot fumes. They are thus subjected to a sintering as soon as they pass through the screen, whereby their cohesion is increased, while they retain some porosity, which is favourable to a uniform melting.

The sintering is accentuated as the granules proceed towards the bottom, whereby their cohesion is increased until the instant when they commence to melt and to be converted into glass.

It is to be emphasised that when the procedure of the present invention is adopted in the manner hereinbefore described, the moistened batch situated on the screen has some viscosity and flows through the screen, while at the outlet from the screen it is drier, becomes frangible and breaks up into granules. Thus, in accordance with the invention, the water content of the batch is given such a gradient as to impart some viscosity to the batch above the screen and to produce a pronounced fractionation of the batch below the screen.

The process of the invention thus permits of forming the granules without employing a high pressure and without the addition of a proportion of water if the humidity inherent in the materials is insufficient.

It therefore does not involve the use of high pressures or of costly materials, owing to the fundamental principle of the invention, which consists in forming the granules at the precise instant when the action of the heat at the bottom is exerted thereon in order to impart the necessary cohesion thereto, while in the known processes the granules are formed at a time when they have yet to undergo certain treatments before being introduced into the furnace, so that it is necessary to impart greater cohesion thereto.

The process of the invention may also be applied to furnaces other than the vertical apparatus illustrated in FIGURE 1 of the accompanying drawings. In fact, the process is applicable to all furnaces, subject to the precaution consisting in subjecting the granules to the effect of a high temperature as soon as they have passed through the granulating screen. For example, the process of the invention is applicable to tank furnaces of the conventional type and the granulating screen may be mounted above an attachment on the input side of the furnace.

The scrapers 11 may be actuated with a reciprocating movement on the screen instead of being rotated.

The apparatus hereinbefore described is completed by two blades 13 suspended from the frame 9—10 by rigid securing means 14, the said blades being so disposed as to gather the materials along the walls of the tank 4 and deflect them towards the centre, while spreading the materials in such manner as to form a more or less irregular bed on which the scrapers 11 act. For this purpose, the lower edges of the blades 13 are disposed at an adjustable distance from the screen 7, so that it is possible to adjust the thickness of the bed of materials and thus to regulate the charging rate.

In addition, the said charging rate may be influenced by the speed of rotation of the system 8e, 8f, 9 to 12.

It is sometimes observed that the materials to be introduced into the furnace more or less adhere to the screen 7 and obstruct some of the meshes therein, whereby efficient operation of the apparatus is impeded.

This disadvantage is obviated by periodically exerting shocks on the screen 7, for example by mounting above it a number of hammers 18 suspended by rods 15 and articulated joints 17 fixed, for example, to the support sleeve 8e, each of the rods 15 being extended beyond the associated articulated joint 17, to form an operating arm 16.

The said operating arms 16 permit of periodically raising the hammers, either manually or automatically, for example by means of a system of abutments 16a fixed, of desired adjustability to the tubular column 8, and of dropping them on to the screen, which is thus subjected to periodic vibrations promoting the detachment of the formed granules.

The mass and the height of the hammers 18 will be so adjusted as to avoid deformation of the screen 7, which would impair the regular operation of the scrapers by producing variations in the thickness of the layer of batch compressed between the said scrapers and the screen 7.

The screen 7 may advantageously consist of a rigid perforated metal plate which is less readily deformed than a meshtype screen.

The hammers 18 may be replaced by one or more vibrations (not shown) fixed to the screen and acting either continuously or intermittently so as to detach the materials regularly from the screen.

Since the process of the invention serves for the formation of grains of uniform composition, it is desirable to check specially the homogeneity of the mixture. In particular, it will be nessary to ensure that the moistening of the latter is as regular as possible. This will be done by sprinking finely divided water, for example with the aid of the sprayers 21', 21'' which may entirely or partially replace the bank 20 and which distribute the water as equally as possible, for example over the jet of materials at the instant when it is introduced into the tank 4, as hereinbefore described. This moistening may be effected at another instant during the preparation of the mixture, but it is desirable that it should take place immediately before the granulation operation in order to avoid any subsequent evaporation and to ensure that the water content is maintained within the desirable limits at the time of the operation.

Modifications may obviously be made to the manner in which the process is performed and to the construction of the apparatus hereinbefore described without departing from the scope of the invention. Thus, for example, the scrapers 11 may be replaced by rollers or they may be combined with rollers, or again the screen, the scrapers and/or the rollers may be replaced by any other appropriate granulating system, for example one comprising cylinders provided with systems of cells or ribs or appropriate cavities.

We claim:

1. In a glass furnace having a vertical tubular charge portion with a throat, a molten glass basin and heating means within said vertical tubular portion to maintain said molten condition of said glass and to melt said charge, the combination therewith comprising a screen having small openings mounted at the throat of said tubular portion, means to feed homogenized charge to said screen, means to add moisture to said charge, and means to force said moisturized charge through said screen to form batch granules.

2. The furnace of claim 1 wherein said forcing means are a plurality of scrapers rotatably mounted on said screen and adapted to slide over the upper surface of said screen.

3. The furnace of claim 1 wherein said screen openings are about 1 to 6 millimeters in diameter.

4. The furnace of claim 1 wherein said screen openings are about 2 to 4 millimeters in diameter.

References Cited in the file of this patent

UNITED STATES PATENTS

| | | |
|---|---|---|
| 1,543,770 | Hilbert | June 30, 1925 |
| 2,180,968 | Schorn et al. | Nov. 21, 1939 |
| 2,366,473 | Bair | Jan. 2, 1945 |
| 2,564,783 | Howard | Aug. 21, 1951 |
| 2,578,110 | Tooley | Dec. 11, 1951 |
| 2,718,096 | Henry et al. | Sept. 20, 1955 |

FOREIGN PATENTS

| | | |
|---|---|---|
| 694,765 | Germany | Aug. 8, 1940 |